United States Patent [19]

Allan

[11] 4,157,488
[45] Jun. 5, 1979

[54] APPARATUS AND METHOD FOR CONTROLLING A TAPE DRIVE TO MAINTAIN A SUBSTANTIALLY CONSTANT LINEAR TAPE VELOCITY

[75] Inventor: James C. Allan, Kinnesswood, Scotland

[73] Assignee: Burroughs Corporation, Detroit, Mich.

[21] Appl. No.: 784,766

[22] Filed: Apr. 5, 1977

[51] Int. Cl.² ............... B65H 59/38; B65H 77/00; H02P 5/46; H02P 7/68
[52] U.S. Cl. ............................ 318/7; 242/75.51; 242/186; 242/191; 360/73
[58] Field of Search .............. 318/6, 7; 242/75.51, 242/186, 191; 307/229; 328/142; 360/73

[56] References Cited

U.S. PATENT DOCUMENTS

| | | | |
|---|---|---|---|
| 3,764,087 | 10/1973 | Paananen et al. | 318/6 |
| 3,769,470 | 10/1973 | Curtis | 242/75.51 |
| 3,842,326 | 10/1974 | Stocker | 318/7 |
| 3,910,527 | 10/1975 | Buhler et al. | 318/7 |

Primary Examiner—J. V. Truhe
Assistant Examiner—Eugene S. Indyk
Attorney, Agent, or Firm—Gerald J. Woloson; Edward J. Feeney, Jr.; Kevin R. Peterson

[57] ABSTRACT

A tape drive including a drive motor; a take-up reel driven thereby; and a motor speed control system controlling the angular velocity of the drive motor for maintaining a substantially constant linear velocity of the tape as it is wound on the take-up reel, said control system comprising: a turns-counter counting the turns of tape as each is applied to the take-up reel; a presettable register; presetting means for presetting a predetermined number in said register at the beginning of a tape drive operation when the take-up reel is empty of tape; means for decrementing the register at a rate, with respect to the rate of application of turns onto the take-up reel, which is initially large during the application of a first predetermined number of turns, and which is subsequently reduced during the application of subsequent turns, to cause the contents of the presettable register to decrease in a non-linear manner with respect to the rate of increase in the number of turns applied to the take-up reel to approximate the non-linear relationship between the angular velocity of the drive motor and the diameter of tape on the take-up reel required to produce a substantially constant linear tape velocity; and motor control means controlling the angular velocity of the drive motor in accordance with the contents of the presettable register.

15 Claims, 4 Drawing Figures

APPARATUS AND METHOD FOR CONTROLLING A TAPE DRIVE TO MAINTAIN A SUBSTANTIALLY CONSTANT LINEAR TAPE VELOCITY

The present invention relates to apparatus and to a method for controlling a tape drive to maintain a substantially constant linear velocity of the tape. The invention is particularly applicable to a reel-to-reel drive for a magnetic tape cassette, and is therefore described below with respect to such application.

Tape drive systems including a drive motor, and a take-up reel driven by the drive motor, commonly include a control system controlling the angular velocity, or rpm, of the drive motor for maintaining a substantially constant linear velocity of the tape as it is wound on the take-up reel. Since the linear velocity of the tape as it is wound on the take-up reel by the drive motor depends on the diameter of the tape on the take-up reel and the angular velocity of the drive motor, in order to maintain a substantially constant linear tape velocity the angular velocity of the drive motor must be reduced as the build-up of tape increases. The relationship between the angular velocity of the drive motor and the diameter of tape on the take-up reel required to produce a substantially constant linear velocity is a non-linear one, being essentially hyperbolic. United Kingdom patent specification No. 1,330,923, assigned to the same assignee as the present application, discloses an improved tape drive wherein the control system includes a counter for counting the number of turns of tape as each is wound on the take-up reel, and an analog circuit including a non-linear correct resistor network producing an output analog signal having a non-linear component which is inversely proportional to the diameter of the tape on the take-up reel and which, when applied to the drive motor control circuit, controls the angular velocity of the drive motor to produce a substantially constant linear tape velocity.

The present invention provides an improved digital control arrangement for controlling the angular velocity of the drive motor to produce a substantially constant linear tape velocity.

According to one aspect of the present invention, there is provided a tape drive including a drive motor; a take-up reel driven thereby; and a motor speed control system controlling the angular velocity of the drive motor for maintaining a substantially constant linear velocity of the tape as it is wound on the take-up reel, said control system comprising: a turns-counter counting the turns of tape as each is applied to the take-up reel; a presettable register; presetting means for presetting a predetermined number in said register at the beginning of a tape drive operation when the take-up reel is empty of tape; means for decrementing the register at a rate, with respect to the rate of application of turns onto the take-up reel, which is initially large during the application of a first predetermined number of turns, and which is subsequently reduced during the application of subsequent turns, to cause the contents of the presettable register to decrease in a non-linear manner with respect to the rate of increase in the number of turns applied to the take-up reel to approximate the non-linear relationship between the angular velocity of the drive motor and the diameter of tape on the take-up reel required to produce a substantially constant linear tape velocity; and motor control means controlling the angular velocity of the drive motor in accordance with the contents of the presettable register.

In the described embodiment, the decrementing means is effective to decrement the presettable register at an initial rate during the application of an initial predetermined number of turns on the take-up reel, and at least two successively lower rates during the application of subsequent predetermined numbers of turns.

The motor control means in the described embodiment includes a digital-to-analog converter for converting the contents of the presettable register to an analog signal, and means controlling the drive motor in accordance with said analog signal.

According to additional features included in the described preferred embodiment, the tape drive further includes a clear leader detector detecting the clear leader at the end of the tape after it is wound on the take-up reel, and means responsive to the detection of the clear leader by said detector for terminating operation of the drive motor. In addition, the drive also includes means for applying a steady-state bias to the motor control means to produce a minimum angular velocity in the drive motor until its operation is terminated by the detection of the clear leader by the clear leader detector.

According to another aspect of the present invention, there is provided a method of controlling the angular velocity of a drive motor driving a take-reel in a tape drive for maintaining a substantially constant linear tape velocity of the tape as it is wound on the take-reel, comprising the steps of: presetting a predetermined number in a presettable register; counting the number of turns of tape as each is applied to the take-reel; decrementing the register at different rates, with respect to the rate of application of the turns onto the take-up reel, to cause the contents of the register to change in a non-linear manner with respect to the rate of increase in the number of turns applied to the take-reel to approximate the non-linear relationship between the angular velocity of the drive motor and the diameter of tape on the take-reel required to produce a substantially constant linear tape velocity; and controlling the angular velocity of the drive motor in accordance with the contents of the presettable register.

It will thus be seen that the non-linear relationship between the drive motor angular velocity and the diameter of tape on the take-up reel required to produce a substantially constant linear tape velocity can be digitally approximated as close as desired by the suitable selection of the different rates of decrementing the presettable register with respect to the rate of application of the turns on the take-up reel. Such a digital control has many advantages over the previously-mentioned non-linear correct resistor network, including the capability of greater accuracy, simpler introduction of initial conditions (e.g., initial tape diameter), and less susceptibility to drift and the like requiring frequent recalibration.

The invention is described below, for purposes of example only, with respect to the accompanying drawings, wherein.

Figure 1:
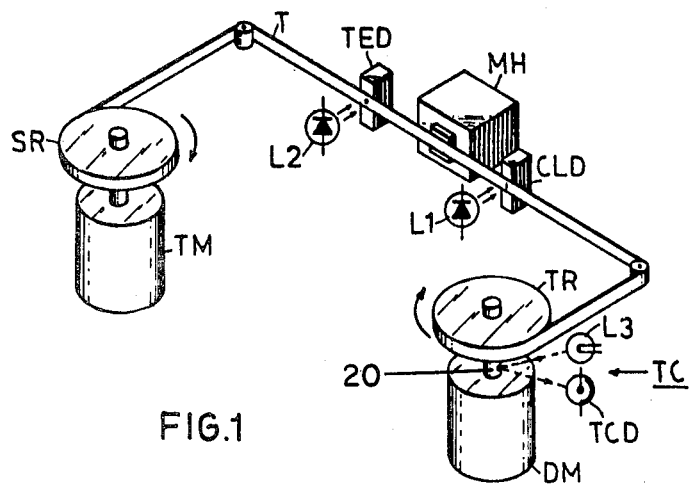
FIG. 1 is a diagrammatic view illustrating a reel-to-reel magnetic tape drive of the type to which the invention is particularly directed.

With reference first to FIG. 1, there is shown a reel-to-reel tape drive system including a drive motor DM driving a take-up reel TR, and a supply reel SR coupled to a torque motor TM, the tape T being wound on the take-up reel TR as the torque motor TM controls tape tension. The system further includes, on one side of the tape T, a magnetic head MH for recording, reading, or erasing information with respect to the tape; a clear leader detector CLD which detects the clear leader at the ends of the tape; a tape end detector TED which detects the holes at the beginning-of-tape (BOT) or at the end-of-tape (EOT); and light sources L1, L2 (e.g., light-emitting diodes) located on the opposite side of the tape for actuating detectors CLD and BED.

Further included is a turns-counter TC for counting the turns of tape as each is applied to the take-up reel TR. In FIG. 1 the turns-counter TC is shown, by way of example, as including a light source L3 projecting a beam of light onto a reflecting element or mark 20 on the shaft of take-up reel TR to reflect a pulse of light to a photo-cell TCD once during each rotation of the take-up reel.

Figure 2:
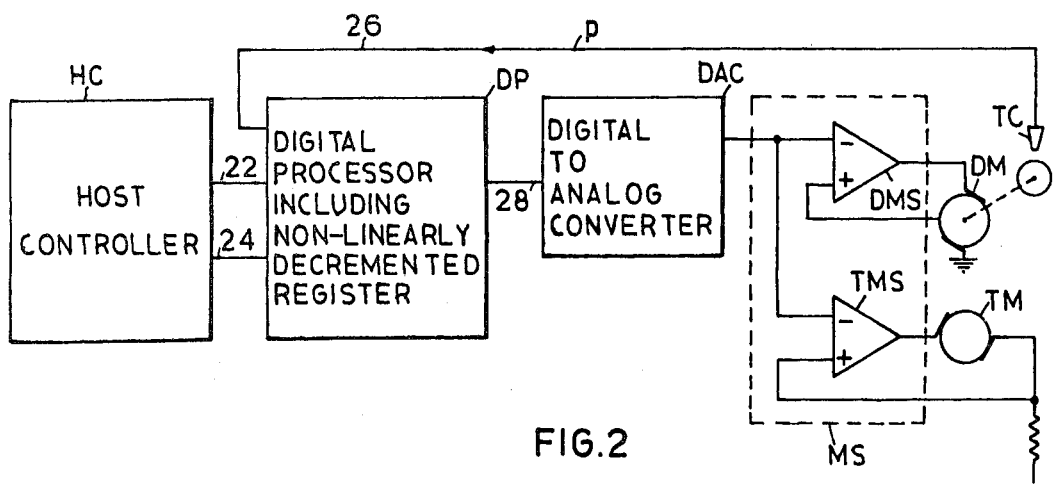
FIG. 2 is a block diagram of the main components of the motor speed control system to produce a substantially constant tape linear velocity in accordance with the present invention.

FIG. 2 illustrates, in block diagram form, the main electrical components of the tape drive of FIG. 1. Briefly, the system includes a digital processor, generally designated DP, adapted to receive input commands via path 22 from the host controller HC, such as a computer, and to output thereto status information via path 24. As to be described more particularly below, digital processor DP includes a presettable register which is preset to a predetermined number at the beginning of the tape drive operation when the take-up reel TR is empty of tape, and means for decrementing the register at different rates, with respect to the rate of application of the turns onto the take-up reel, to cause the contents of the register to change in a non-linear manner with respect to the rate of increase in the number of turns applied to the take-up reel to approximate the non-linear relationship between the angular velocity of the drive motor TM and the diameter of tape on the take-up reel TR required to produce a substantially constant linear tape velocity. The turns data, indicated as "p" in FIG. 2, is derived from the turns-counter TC and is supplied to the digital processor DP via path 26. The data from the digital processor DP indicative of the contents of the presettable register therein is outputted via path 28 to a linear digital-to-analog converter DAC, the latter producing an analog signal which is applied to the motor servo system MS. The latter system includes drive motor servo DMS controlling the angular velocity of the drive motor DM such as to maintain a substantially constant linear tape velocity, and the torque motor servo TMS controlling the torque motor TM to control the tension of the tape as it is driven by the drive motor at a substantially constant linear tape velocity.

Figure 4:
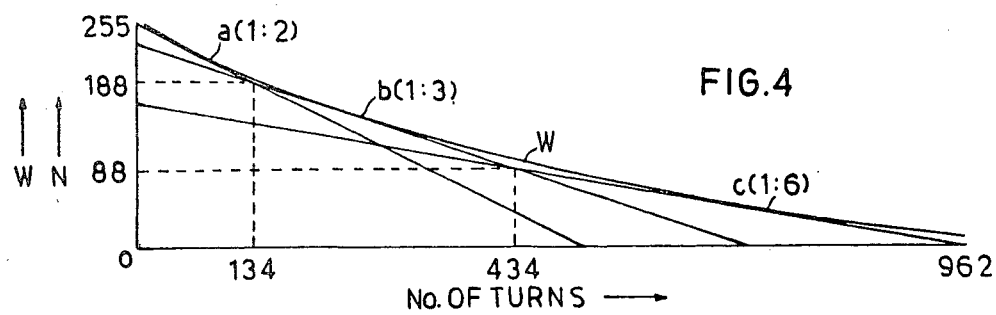
FIG. 4 is a curve diagram helpful in understanding the operation of the system of FIG. 3 to produce a substantially constant linear tape velocity.
Figure 3:
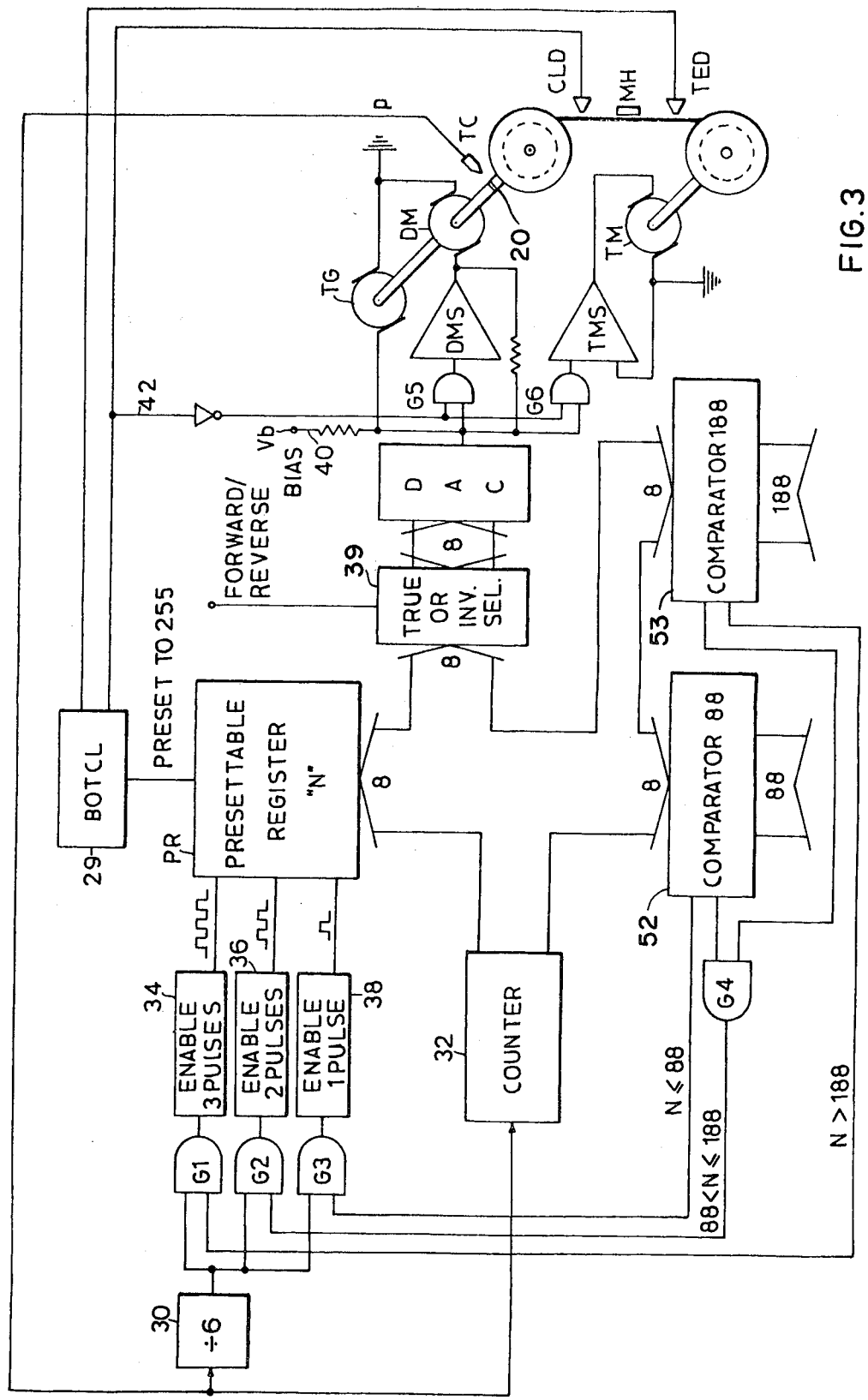
FIG. 3 illustrates a logical circuit implementation of the motor speed control system of FIG. 2.

FIG. 3 diagrammatically illustrates, in conventional logic circuit form, more particulars of the digital processor DP which may be used in the system of FIG. 2 in order to produce a substantially constant linear tape velocity; and the curve diagram of FIG. 4 illustrates how this is accomplished by the system of FIG. 3.

In FIG. 3, the clear leader detector CLD and the tape end detector TED transmit their signals to a logic unit 29 which outputs a signal BOTCL at the beginning-of-tape clear-leader to a presettable register PR to preset the register with a predetermined number, "255" in the described example. The turns-counter TC counts each revolution of the drive motor DM and produces an output pulse "p" for each count. These pulses are applied to a divide-by-six divider circuit 30 producing a single output pulse for each six input pulses.

The output of divider circuit 30 is applied to three AND-gates G1, G2, G3. These gates are selectively enabled, according to the total number of turns counted by the turns-counter TC, to decrement presettable register PR from the initially preset quantity "255". The quantity in register PR at any time is represented by the value "N", and this quantity is continuously compared by means of a pair of comparators 52, 53 to selectively control the gates. Thus, gate G1 is enabled via comparator 53 whenever the value "N" in the presettable register is greater than "188", enabling this gate causing three pulses to be applied via circuit 34 to the presettable register PR. Gate G2 is enabled via AND-gate G4 connected to both comparators 52, 53, whenever the value "N" is between "88" and "188", enabling this gate causing two pulses to be applied via circuit 36 to the presettable register PR. Gate G3 is enabled via comparator 52 whenever the presettable register value "N" is less than "88", enabling this gate causing a single pulse to be applied via circuit 38 to the presettable register PR.

It will thus be seen that the presettable register PR is decremented initially (via gate G1) at the rate of "1" for each two turns applied to the take-up reel for the first 134 turns as register PR is decremented from 255 to 188; then "1" for each three turns thereafter (via gate G2) for the next 300 turns as register PR is decremented from 187 to 89; and finally "1" for each six turns thereafter (via gate G3) for the remaining 528 turns as register PR is decremented from 88 to 00, or until the operation of the drive motor is terminated in the manner to be described below.

The contents "N" of presettable register PR, initially preset to the count of "255" and then decremented at the different rates as described above, are outputted via a circuit 39 to a digital-to-analog converter DAC. Circuit 39 responds to a Forward drive command to cause the true contents of presettable register PR to be inputted into the digital-to-analog converter DAC, and responds to a Reverse drive command to cause the inverse (i.e., the complement) of the presettable register contents to be inputted into converter DAC.

Thus, digital-to-analog converter DAC produces an analog signal in accordance with the true contents "N" of presettable register PR during the Forward drive mode, and in accordance with the complement of its contents during the Reverse drive mode. This analog signal is fed to the motor servo system MS (FIG. 2), which includes the drive motor servo DMS for controlling the drive motor DM, and the torque motor servo TMS for controlling the torque motor TM. The system of FIG. 3 further includes a tachometer generator TG mechanically coupled to the drive motor DM for providing a feedback signal to the motor servo system, as well known in such controls.

It will thus be seen that the motor servo system is controlled by the non-linear analog signal from the digital-to-analog converter DAC, which analog signal represents the non-linear decrementing of the presettable register PR with respect to the rate of application of the turns onto the take-up reel TR. As will be described below with respect to the curve diagram of FIG. 4, this non-linear decrementing of the presettable register provides a close approximation of the non-linear relationship between the angular velocity of the drive motor DM and the number of turns on the take-up reel TR required to produce a substantially constant linear tape velocity. The motor servo system further includes a steady-state bias Vb, schematically shown by input line 40, to provide a minimum angular velocity of the drive motor until its operation is terminated by the clear leader signal from the clear-leader detector CLD at the end of tape, this being schematically shown by line 42 disabling gates G5 and G6 feeding the analog signal from the digital-to-analog converter DAC to the drive and torque motor servos DMS, TMS when the clear leader at the end of the tape is detected.

The operation of the system of FIG. 3 will be better understood by the curve diagram of FIG. 4 which illustrates how the contents of the presettable register PR will vary with the increase in the number of turns applied to the take-up reel TR as sensed by the turns-counter TC. Thus, as shown in FIG. 4, when there are "0" turns on the take-up reel, register PR is preset with the number "255" this being effected via detectors CLD and TED which, as described above, produce a beginning-of-tape clear leader signal BOTCL outputted from logic unit 29 and applied to presettable register PR to preset same with the number "255". As also described above, during the application of the first 134 turns, register PR is decremented at the rate of "1" for each two turns applied to the take-up reel, this being shown by line segment "a" in FIG. 4; during the application of the next 300 turns, the register is decremented at the rate of "1" for each three turns, this being shown by line segment "b" in FIG. 4; and thereafter the register is decremented at the rate of "1" for each six turns, this being shown by line segment "c", until the motor operation is terminated by the clear leader signal.

The analog signal outputted by the digital-to-analog converter DAC to the motor servo system MS, and therefore the angular velocity of the drive motor DM, will also vary according to the non-linear variation in the contents of the presettable register PR as shown by line segments "a", "b", and "c" in FIG. 4. Curve "w" in FIG. 4 illustrates how the angular velocity of the drive motor DM should decrease in a non-linear manner with respect to the increase in tape diameter to provide a constant linear tape velocity. As can be seen from FIG. 4, the curve made up of the above line segments, a, b, c, corresponding to the non-linear variation of the contents of register PR with the increase in the number of turns applied to the take-up reel TR, closely approximates curve "w" corresponding to the non-linear variation of the drive motor DM angular velocity "W" with the increase in tape diameter to produce a substantially constant linear tape velocity. Accordingly, it will be seen that when the contents of register PR are converted to an analog signal by the digital-to-analog converter DAC, and applied to the motor servo system, the angular velocity of the drive motor DM will be controlled to provide a substantially constant linear tape velocity.

As indicated earlier, the motor servo system also controls the torque motor TM to control the tension on the tape as it is driven at the constant linear velocity by drive motor DM. In addition, tachometer generator TG mechanically coupled to drive motor DM provides feedback information to the motor servo system MS. Such motor servo systems are well known and therefore further details of its construction or operation are not deemed necessary.

As the contents of register PR are decremented to approach "0", the drive motor DM will still be rotating at a small angular velocity as determined by the steady state bias (Vb) applied to the motor servo system MS via line 40. The actual termination of the operation of the drive motor DM is determined by the detection of the clear leader at the end of the tape via line 42.

In the Reverse drive mode, the torque motor TM drives the tape onto the supply reel SR with constant tension while the drive motor DM acts as a pay-out control to control the speed of the tape. In this mode, logic unit 39 causes the complement of the contents "N" of the presettable register PR, rather than the true contents of this register, to be outputted to the digital-to-analog converter DAC which produces the non-linear analog signal applied to the motor servo system. This complementing is necessary since the drive motor is now rotating in the opposite direction.

While the invention has been described with respect to a conventional logic circuit implementation of the motor speed control system, it will be appreciated that the system could be implemented by other means, particularly by a microprocessor.

Many other variations, modifications and applications of the described embodiment of the invention will be apparent.

What we claim is:

1. A tape drive including a drive motor; a take-up reel driven thereby; and a motor speed control system controlling the angular velocity of the drive motor for maintaining a substantially constant linear velocity of the tape as it is wound on the take-up reel, said control system comprising: a turns-counter counting the turns of tape as each is applied to the take-up reel; a presettable register; presetting means for presetting a predetermined number in said register at the beginning of a tape drive operation when the take-reel is empty of tape; means, responsive to said turns counter, for decrementing the register at a rate, with respect to the rate of application of turns onto the take-up reel, which is initially large during the application of a first predetermined number of turns, and which is subsequently reduced during the application of subsequent turns, to cause the contents of the presettable register to decrease in a non-linear manner with respect to the rate of increase in the number of turns applied to the take-up reel to approximate the non-linear relationship between the angular velocity of the drive motor and the diameter of tape on the take-up reel required to produce a substantially constant linear tape velocity; and motor control means controlling the angular velocity of the drive motor in accordance with the contents of the presettable register.

2. A tape drive according to claim 1, wherein said decrementing means is effective to decrement the presettable register at an initial rate during the application of an initial predetermined number of turns on the take-up reel, and at least two successively lower rates during the application of subsequent predetermined numbers of turns.

3. A tape drive according to claim 1, wherein said motor control means includes a digital-to-analog converter for converting the contents of the presettable register to an analog signal, and means controlling the drive motor in accordance with said analog signal.

4. A tape drive according to claim 1, further including a clear leader detector detecting a clear leader at the end of the tape after it is wound on the take-up reel, and means responsive to the detection of the clear leader by said detector for terminating operation of the drive motor.

5. A tape drive according to claim 4, further including means for applying a steady-state bias to the motor control means to produce a minimum angular velocity in the drive motor until its operation is terminated by the detection of the clear leader by the clear leader detector.

6. A tape drive according to claim 1, further including a supply reel for supplying tape to the take-up reel; and a torque motor coupled to the supply reel; said motor control means also controlling the torque motor angular velocity to control the tape tension as the tape is reeled from the supply reel to the take-up at substantially constant linear velocity.

7. A tape drive according to claim 6, wherein said motor control means includes a Forward drive control effective to cause the true contents of the presettable register to be utilized for controlling the angular velocity of the drive motor, and a Backward drive control effective to cause the inverse contents of the presettable register to be utilized for controlling the angular velocity of the drive motor.

8. A tape drive according to claim 1, wherein the take-up reel and supply reel are incorporated in a magnetic-tape cassette; wherein the means for presetting the register presets same with the number "255" ; and wherein the decrementing means decrements the register initially at the rate of "1" for each two turns applied to the take-up reel, then at the rate of "1" for each three turns, and then at the rate of "1" for each six turns until the operation of the drive motor is terminated by the clear leader detector.

9. A method of controlling the angular velocity of a drive motor driving a take-up reel in a tape drive for maintaining a substantially constant linear tape velocity of the tape as it is wound on the take-up reel, comprising the steps of: presetting a predetermined number in a presettable register; counting the number of turns of tape as each is applied to the take-up reel; decrementing the register, in response to the previous counting step, at different rates, with respect to the rate of application of the turns onto the take-up reel, to cause the contents of the register to change in a non-linear manner with respect to the rate of increase in the number of turns applied to the take-up reel to approximate the non-linear relationship between the angular velocity of the drive motor and the diameter of tape on the take-up reel required to produce a substantially constant linear tape velocity; and controlling the angular velocity of the drive motor in accordance with the contents of the presettable register.

10. The method according to claim 9, wherein said presettable register is decremented at an initial rate during the application of an initial predetermined number of turns on the take-up reel, and at least two successively lower rates during the application of subsequent predetermined numbers of turns.

11. The method according to claim 9, wherein the angular velocity of the drive motor is controlled in accordance with the contents of the presettable register by converting the contents of the register to an analog signal and controlling the drive motor in accordnace with said analog signal.

12. The method according to claim 9, including the further steps of: applying a steady state bias to the motor control circuit to provide a minimum angular velocity to the drive motor; detecting a clear leader at the end of the tape after it is wound on the take-up reel; and terminating the operation of the drive motor when the clear leader is detected.

13. The method according to claim 9, wherein the tape drive further includes a supply reel for supplying tape to the take-up reel, and a torque motor coupled to the supply reel; and wherein the angular velocity of the torque motor is also controlled in accordance with the contents of the presettable register to control the tape tension as the tape is reeled from the supply reel to the take-up reel at substantially constant linear velocity.

14. The method according to claim 13, wherein the true contents of the presettable register are used to control the angular velocity of the drive motor during the Forward drive thereof, and the inverse contents of the presettable register are used to control the angular velocity of the drive motor during the Backward drive thereof.

15. The method according to claim 13, wherein the presettable register is initially preset with the number "255", and is decremented initially at the rate of "1" for each two turns applied to the take-up reel, then at the rate of "1" for each three turns, and then at the rate of "1" for each six turns until the operation of the drive motor is terminated by the detection of the clear leader.

* * * * *

UNITED STATES PATENT AND TRADEMARK OFFICE
CERTIFICATE OF CORRECTION

PATENT NO. : 4,127,488
DATED : 11/28/78
INVENTOR(S) : Bell, et al

It is certified that error appears in the above-identified patent and that said Letters Patent are hereby corrected as shown below:

in column 4, line 58 delete "7" and insert --10--.

Signed and Sealed this

Sixth Day of March 1979

[SEAL]

Attest:

RUTH C. MASON
Attesting Officer

DONALD W. BANNER
Commissioner of Patents and Trademarks